(12) United States Patent
Ng et al.

(10) Patent No.: US 8,037,722 B2
(45) Date of Patent: Oct. 18, 2011

(54) BRAKE DISK LOCK HAVING A TILTED LOCKING BOLT

(75) Inventors: Hoi Jarm Ng, Tuen Mun (CN); Wai Leung Ng, legal representative, Tuen Mun (CN); Kaj Vestman, Wetter (DE)

(73) Assignee: ABUS August Bremicker Soechne KG, Wetter-Volmarstein (DE)

( * ) Notice: Subject to any disclaimer, the term of this patent is extended or adjusted under 35 U.S.C. 154(b) by 0 days.

(21) Appl. No.: 12/817,584

(22) Filed: Jun. 17, 2010

(65) Prior Publication Data

US 2010/0319417 A1 Dec. 23, 2010

(30) Foreign Application Priority Data

Jun. 23, 2009 (DE) .......................... 10 2009 030 033

(51) Int. Cl.
*E05B 67/36* (2006.01)
(52) U.S. Cl. ................................ 70/33; 70/233; 188/265
(58) Field of Classification Search ................ 70/33, 34, 70/233, 225–228; 188/265
See application file for complete search history.

(56) References Cited

U.S. PATENT DOCUMENTS

| | | | | |
|---|---|---|---|---|
| 2,104,981 A * | 1/1938 | Falk | ................................... | 70/33 |
| 2,231,546 A * | 2/1941 | Neiman | ........................... | 70/233 |
| 4,037,441 A * | 7/1977 | Ray | ................................... | 70/233 |
| 4,038,847 A * | 8/1977 | Bennett | ........................... | 70/233 |
| 5,365,758 A * | 11/1994 | Shieh | ................................ | 70/33 |
| 5,379,618 A * | 1/1995 | Shieh | ................................ | 70/33 |
| 5,492,206 A * | 2/1996 | Shieh | ........................... | 188/265 |
| 5,515,947 A * | 5/1996 | Shieh | .............................. | 188/69 |
| 5,517,837 A * | 5/1996 | Wang | .............................. | 70/226 |
| 5,823,025 A * | 10/1998 | Phifer | ............................. | 70/226 |
| 5,964,107 A * | 10/1999 | Chang | ............................... | 70/33 |
| 7,281,400 B2* | 10/2007 | Muerza | ........................... | 70/233 |
| 7,467,530 B2* | 12/2008 | Torrado et al. | .................... | 70/33 |
| 2009/0145705 A1* | 6/2009 | Weiershausen | ............... | 188/265 |

FOREIGN PATENT DOCUMENTS

| DE | 296 19 213 U1 | 1/1997 |
|---|---|---|
| DE | 10 2005 043 926 A1 | 3/2007 |
| FR | 2 720 711 A1 | 12/1995 |

OTHER PUBLICATIONS

German Search Report dated Apr. 30, 2010. DE 10 2009 030 033.3.

* cited by examiner

*Primary Examiner* — Suzanne Barrett
(74) *Attorney, Agent, or Firm* — Gifford, Krass, Sprinkle, Anderson & Citkowski, P.C.

(57) ABSTRACT

A brake disk lock having a lock body which has a first housing section and a second housing section which bound a receiving gap for the reception of a brake disk in a typically U-shaped arrangement. A locking bolt is provided at the first housing section and is movable along a closing direction from a release position into a closed position. In the closed position, the locking bolt engages into an engagement opening of the second housing section and closes the receiving gap. The closing direction of the locking bolt is aligned obliquely to the receiving gap of the lock body at an angle different from 90°.

18 Claims, 2 Drawing Sheets

BRAKE DISK LOCK HAVING A TILTED LOCKING BOLT

CROSS-REFERENCE TO RELATED APPLICATION

This application claims priority of German Patent Application 10 2009 030 033.3 filed Jun. 23, 2009.

FIELD OF THE INVENTION

The invention relates to a brake disk lock having a lock body which has a first housing section and a second housing section which bound a receiving gap for the reception of a brake disk in a typically U-shaped arrangement. A locking bolt is provided at the first housing section and is movable along a closing direction from a release position into a closed position. In the closed position, the locking bolt engages into an engagement opening of the second housing section and closes the receiving gap.

BACKGROUND OF THE INVENTION

Such a brake disk lock serves for the securing of, for example, a motorcycle, a motor scooter or a quad bike against unauthorized use. For this purpose, the lock is applied to a brake disk of the parked vehicle such that the brake disk projects into the receiving gap formed by the housing sections. The locking bolt is thereupon moved into the closed position such that the locking bolt is guided through an opening of the brake disk. The lock is hereby captured at the brake disk and the use of the vehicle is prevented until the lock is again released from the brake disk. A latching mechanism is provided at the lock body by which the locking bolt can be selectively latched or unlatched.

A typical break-open attempt to violently open a brake disk lock having a U-shaped structure comprises hammering a chisel into the receiving gap, and indeed into the intermediate space between the brake disk and the lock body. The U-shaped arrangement of the housing sections should hereby be spread apart and ultimately the receiving gap closed by the locking bolt should be opened so that the lock can be removed from the brake disk.

A brake disk lock of the initially named kind is known from DE 10 2005 043 926 A1. To provide improved security against being broken open, in particular with respect to a spreading apart or prizing open at the housing sections by the action of a chisel or the like, the locking bolt in this lock—even if it is in the closed position—is supported at the first housing section displaceably in the direction of the second housing section. The locking bolt can thus be moved even further in its locked position from a normal position of use in the direction of the second housing section, namely into a moved out position. If the second housing section is spread apart from the first housing section of the lock body by a corresponding act of violence, the locking bolt can hereby follow the movement of the violently displaced second housing section and the receiving gap of the lock body continues to remain closed. Whereas such a design has proved itself in practice, the structure and the manufacture of such a brake disk lock are undesirably complex and/or expensive.

SUMMARY OF THE INVENTION

It is an object of the invention to provide a brake disk lock with improved security against being broken open, in particular with respect to a spreading apart or prizing open of the housing sections by action of a chisel or the like, wherein the brake disk lock should have a simplified construction. The brake disk lock should further be simple to operate.

This object is satisfied by a brake disk lock having the features of claim 1 and in particular in that the closing direction of the locking bolt is aligned obliquely to the receiving gap of the lock body at an angle different from 90°.

In the brake disk lock in accordance with the invention, the closing direction of the locking bolt does not extend orthogonally to the direction of extent of the receiving gap or to the plane of extent of a brake disk projecting into the receiving gap, but rather obliquely (i.e. tilted) to such an orthogonal arrangement and obliquely to the direction of extent of the receiving gap. The end of the locking bolt engaging into the engagement opening of the second housing section thus does not extend orthogonally to the receiving gap, but rather inclined thereto. It is hereby achieved that on a violent spreading apart or prizing open of the two housing sections, the named locking belt end increasingly wedges in the engagement opening of the second housing section so that an opening of the receiving gap is made substantially more difficult and is practically prevented. On such a spreading apart or prizing open, the two housing sections namely move apart from one another in a different direction than the direction of the obliquely aligned axis of the closing bolt in the region of the engagement opening.

As a result, high security against being broken open is achieved, with simultaneously a simple structure of the brake disk lock being possible. A so-called automatic function can in particular be realized—as will be explained in the following—so that the brake disk lock in accordance with the invention is additionally characterized by a simplified handling.

A "oblique" alignment in connection with the present invention denotes an alignment at an angle >0° and <90° relative to the reference direction. An angle called "acute" in connection with the invention denotes an angle >0° and <45°.

In accordance with an advantageous embodiment, the closing direction of the locking bolt is aligned an angle between 60° and 80° obliquely to the direction of extent of the receiving gap. The explained cooperation of the locking bolt end with the associated engagement opening in the event of a break-open attempt hereby takes place particularly effectively while the locking bolt can still be guided without problem through an opening of a brake lock (in particular a venting opening). The angle preferably amounts to approximately 70°.

It is furthermore of advantage if the engagement opening of the second housing section receives the locking bolt in a substantially shaped-matched manner. In other words, the second housing section should surround the locking bolt end introduced into the engagement opening substantially a really at the periphery. A particularly effective wedging of the locking bolt at the second housing section is also hereby achieved in the case of a breaking open attempt of the explained kind.

It is furthermore preferred if the locking bolt is made cylindrical (with respect to its closed position) at least in the region of the receiving gap of the lock body and of the engagement opening of the second housing section, i.e. the locking bolt is elongated with a round cross-section along a longitudinal axis (with a varying cross-section also being able to be provided along the longitudinal axis). The locking bolt can hereby have a particularly simple structure and the associated engagement opening can also be made as a simple cylindrical bore (with the axis of the bore being aligned obliquely to the receiving gap in accordance with the inclination of the locking bolt.

In accordance with a further advantageous embodiment, a latch can furthermore be provided at the first housing section and is movable along a latching direction from an unlatched position into a latched position to latch the locking bolt in the locked position. A particularly compact structure of the first housing section and thus of the lock body as well as a simple accessibility of a lock cylinder cooperating with the latch are achieved when the latching direction of the latch is aligned obliquely to the named closing direction of the locking bolt. In this respect, the latching direction of the latch can be aligned obliquely or parallel to the direction of extent of the receiving gap of the lock body.

As already mentioned, a so-called automatic function can be provided for the brake disk lock to achieve particularly simple handling. For this purpose, the latch is biased by means of a spring in the direction of the latched position in which the latch is able to latch the locking bolt in its closed position. The locking bolt can thus be latched automatically in the closed position by moving the locking bolt from the release position into the closed position. To be able to move the latch selectively back out of the latched position into the unlatched position, a lock cylinder is provided at the first housing section which can be actuated by means of an associated key and cooperates with the latch via a driver device. Due to the explained wedging of the locking bolt in the associated engagement opening in the event of a break-open attempt, such an automatic function can be realized without impairment of the security against being broken open. It is in particular not necessary, for example, that the locking bolt is rotated about its longitudinal axis and cooperates via additional gripping lugs or the like with the engagement opening, as is known from the initially named DE 10 2005 043 926 A1.

It is preferred for such a design if the locking bolt is biased by means of a further spring in the direction of the release position. The locking bolt is thus moved automatically into the release position by pulling the latch back out of the latched position into the unlatched position.

BRIEF DESCRIPTION OF THE DRAWINGS

The invention will be described in the following only by way of example with reference to the drawings.

DETAILED DESCRIPTION OF THE PREFERRED EMBODIMENTS

Figure 1:
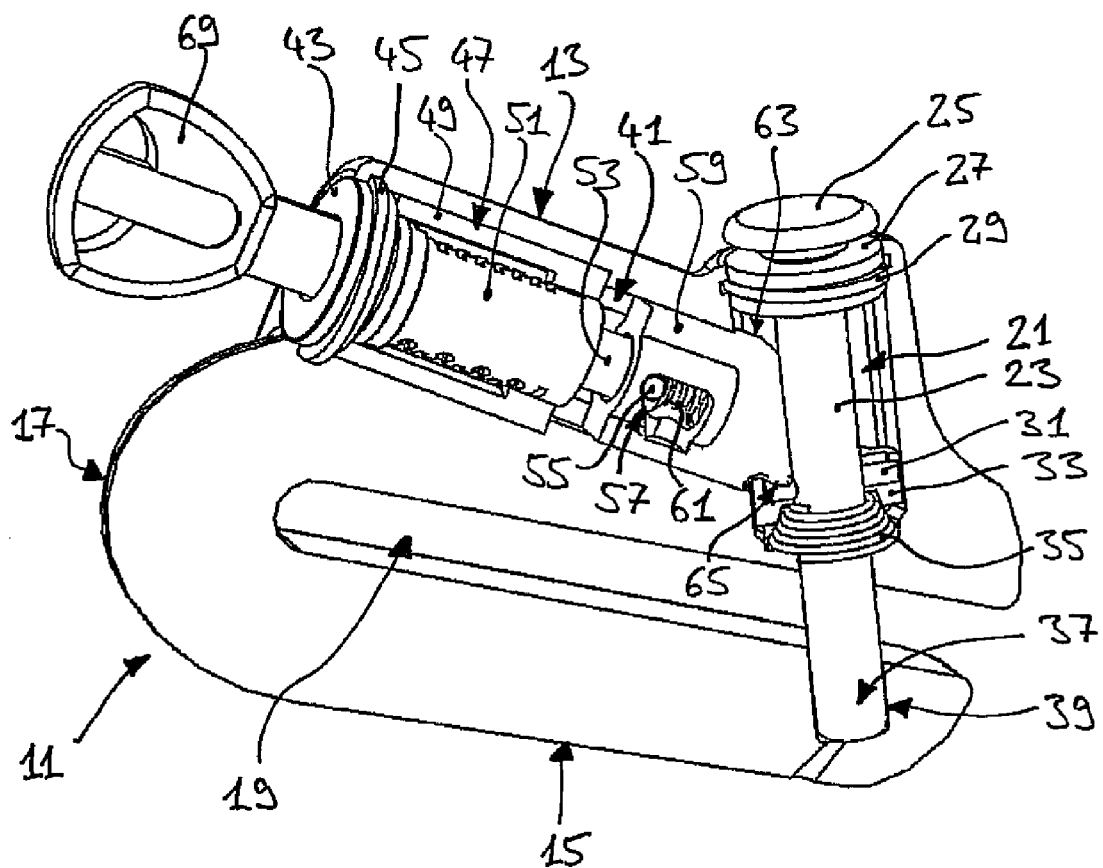
FIG. 1 shows a partly cut-away perspective view of a brake disk lock.
Figure 1:
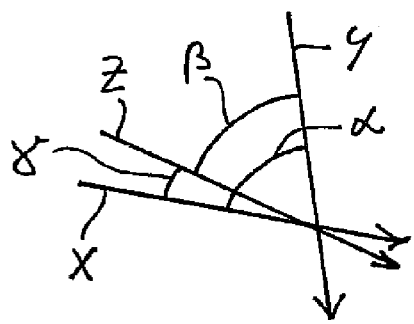

The brake disk lock shown in the Figures can be fixed to a brake disk of a motorcycle or the like to secure it against unauthorized use. For this purpose, the brake disk lock has a lock body 11 of metal. The lock body 11 includes a first housing section 13 and a second housing section 15 which are connected to one another in one piece via a connection section 17 and which bound a receiving gap 19 for the reception of a brake disk in a substantially U-shaped arrangement. The receiving gap 19 extends in a straight line along a direction of extent X between the two housing sections 13, 15.

A locking bolt passage 21 is formed at the first housing section and a locking bolt 23 is supported axially movable in it. The locking bolt 23 is made of metal and is substantially cylindrical, i.e. it extends in a straight line and has a round cross-section. The locking bolt 23 has an actuating cap 25 projecting out of the lock body 11 at the end remote from the second housing section 15. At this end of the locking bolt 23, the locking bolt passage 21 is closed by means of a closure ring 27 which surrounds the locking bolt 23 at the periphery and which is fixed to the lock body 11 by means of a securing ring 29.

Figure 3:
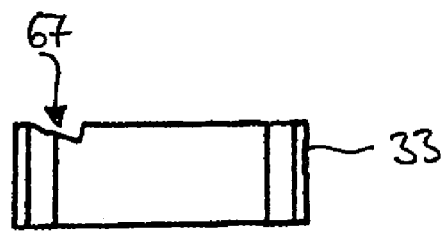
FIG. 3 shows an enlarged side view of a holding ring of the brake disk lock.

A holding ring 33 is fixed to the locking bolt 23 by means of a fastening pin at approximately half the height (cf. also side view in accordance with FIG. 3). A first compression spring 35 which surrounds the locking bolt 23 is located within the locking bolt passage 21. The first compression spring 32 is supported, on the one hand, at the base of the locking bolt passage 21 and, on the other hand, at the lower side of the holding ring 33. The first compression spring 35 thus biases the locking bolt 23 against a closing direction Y in the direction of a release position.

Figure 2:
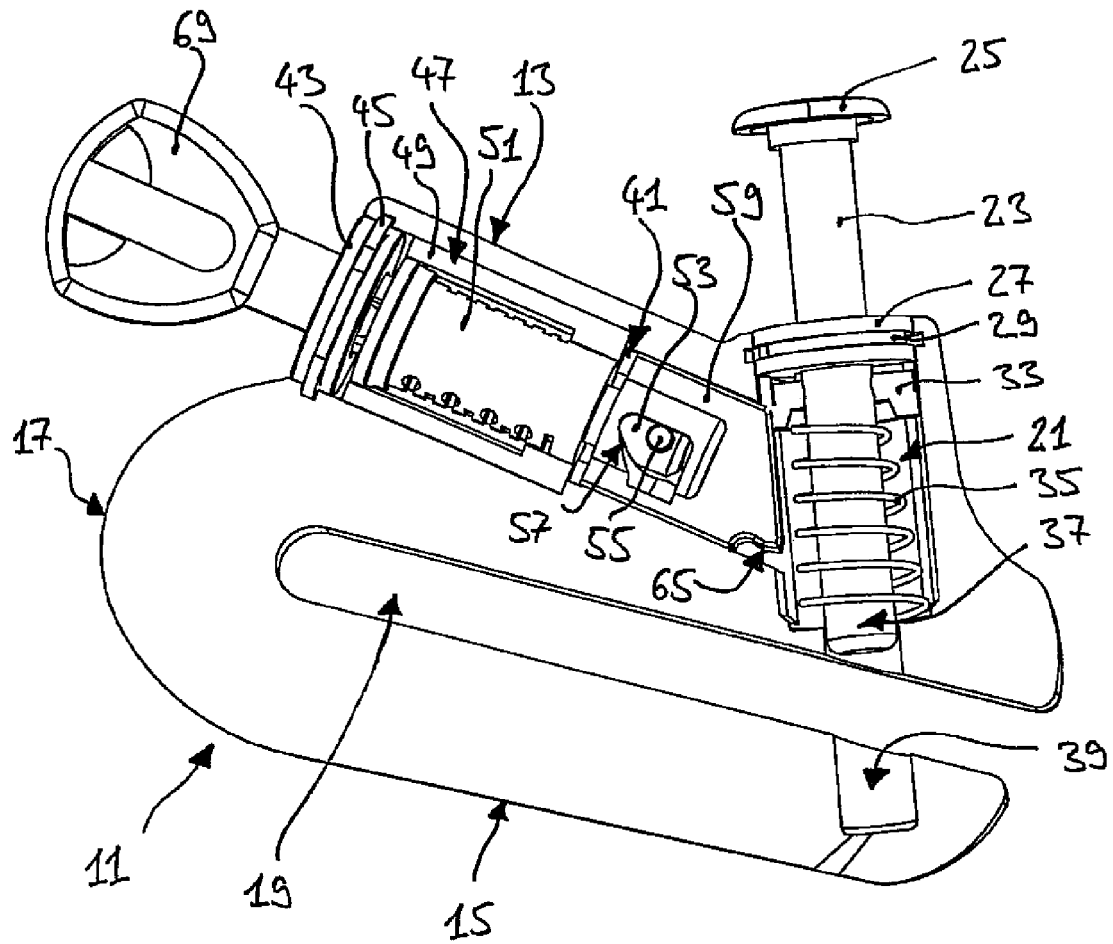
FIG. 2 shows a partly cut-away side view of the brake disk lock.

FIG. 1 shows a closed position of the locking bolt 23, whereas FIG. 2 shows the named release position. In the closed position, the end 37 of the locking bolt 23 facing the second housing section engages into an engagement opening 39 of the second housing section 15. The locking bolt 23 hereby closes the receiving gap 19. The engagement opening 39 is cylindrical so that the engagement opening 39 receives the likewise cylindrical locking bolt end 37 in a shape matched manner. In the closed position of the locking bolt 23 in accordance with FIG. 1, only a small ring gap accordingly remains between the locking bolt end 37 and the engagement opening 39 of the second housing section 15.

A special feature of the braking disk lock shown comprises the fact that the closing direction Y of the locking bolt 23 (i.e. the longitudinal axis of the cylindrical locking bolt 23) is aligned (i.e. oriented) at an angle α different from 90° obliquely to the direction of extent X of the receiving gap 19. In this respect, the end of the locking bolt 23 remote from the engagement opening 39 is inclined in the direction of the closed end of the receiving gap 19 (i.e. in the direction of the connection section 17). In the embodiment shown here, the angle α is 70°.

In the first housing section 13 of the lock body 11, a latch passage 41 is furthermore formed which opens into the locking bolt passage 21. The latch passage 41 is closed outwardly by a closure ring 43 which is fixed to the lock body 11 by means of a securing ring 45. A lock cylinder 47, which includes a fixed-position cylinder housing 49 and a rotatable cylinder core 51, is located within the latch passage 41. A driver pin 55 is located at a driver projection 53 of the cylinder core 51. Said driver pin cooperates with a slotted link 57 of an axially movable latch 59. The latch 59 is biased by means of a second compression spring 61, starting from an unlatched position in accordance with FIG. 2, in the direction of a latching position in accordance with FIG. 1 along a latching direction Z. In the latched position, the latch 59 projects in the closed position into the locking bolt passage 21 to latch the locking bolt 23. The named latching direction Z of the latch 59 and the closing direction Y of the locking bolt 23 include an angle β and the latching direction Z of the latch 59 includes an acute angle γ with the direction of extent X of the receiving gap 19 of the lock body 11. The direction of extent X of the receiving gap 19, the closing direction Y of the locking bolt 23 and the latching direction Z of the latch 59 lie within a common plane.

The latch 59 has a run-on slope 63 at its front side facing the locking bolt passage 21. The latch 59 furthermore has an engagement nose 65 at its front side which cooperates with an engagement recess 67 of the holding ring 33 (cf. FIG. 3) to effect a snap fit, i.e. a force locking connection between the latch 59 and the locking bolt 23 when the locking bolt 23 is in the closed position and the latch 59 is in the latched position.

The operation of the brake disk lock shown will be explained in the following.

Starting from the release position of the locking bolt 23 in accordance with FIG. 2, the brake disk lock is placed onto a brake disk such that an opening of the brake disk is located between the locking bolt passage 21 of the first housing section 13 and the engagement opening 39 of the second housing section 15. By pressing the actuation cap 25, the locking bolt 23 can now be moved against the bias (first compression spring 35) along the closing direction Y into the closed position in accordance with FIG. 1 until the locking bolt end 37 engages completely into the engagement opening 39. The locking bolt 23 is in this respect moved in a straight line along its longitudinal axis without an additional rotary movement about its longitudinal axis. The latch 59, which has been urged back into the latch passage 41 by the holding ring 33 up to this time, can now snap into the latched position in accordance with FIG. 1 along the latching direction Z due to its bias (second compression spring 61) such that the latch 59 engages in the closed position into the locking bolt passage 21 and hereby secures the locking bolt 23. If the locking bolt 23 is now released, due to the bias (first compression spring 35), it can escape back just so far out of the previously adopted position that the engagement nose 65 of the latch 59 engages into the engagement recess 67 of the holding ring 33 to form the already named snap fit.

It must be noted that due to the cooperation of the spring-biased locking bolt 23 with the likewise spring-biased latch 59 an automatic function is realized. In other words, the user only has to press the locking bolt 23 completely into the closed position—to fix the brake disk lock to the brake disk—without an actuation of the lock cylinder 47 being required in this respect. As explained, in this respect a rotary movement of the locking bolt 23 is also not required, but it is rather moved along the closing direction Y in a purely translatory manner.

To release the brake disk lock from the brake disk again, it is necessary to bring the locking bolt 23 back from the closed position in accordance with FIG. 1 into the release position in accordance with FIG. 2. For this purpose, the lock cylinder 47 is rotationally actuated in the opening sense by means of an associated key 69. The driver pin 55 hereby cooperates with the slotted link 57 (FIG. 1) such that the latch 59 is drawn back against the explained spring bias (second compression spring 61) into the unlatched position in accordance with FIG. 2. At the start of this movement, the holding ring 33 together with the locking bolt 23 is urged briefly along the closing direction Y to enable a release of the engagement nose 65 of the latch 59 from the engagement recess 67 of the holding ring 33 (cancellation of the named snap fit). As soon as the latch 59 has been moved completely out of the locking bolt passage 21 in this manner, the locking bolt 23 can snap into the release position in accordance with FIG. 2 due to its bias (first compression spring 35). The key 69 can now be rotated back into the starting position again and can be removed. The holding ring 33 contacting the front side of the latch 59 holds back the latch 59 biased in the direction of the latched position in this state.

A particular advantage of the brake lock shown is the explained oblique position of the axis of the locking bolt 23 and of the associated engagement opening 39 (closing direction Y) relative to the direction of extent X of the receiving gap 19 of the lock body 11. Provided namely that, on a break-open attempt, the two housing sections 13, 15 of the lock body 11 are moved apart by spreading apart or prizing open, the locking bolt 37, which is aligned obliquely for this purpose, prevents a widening of the receiving gap 19 at its open end since the direction of movement of the two housing sections 13, 15 relative to one another (which essentially extends perpendicular to the direction X) and the direction of movement of the locking bolt 23 relative to the engagement opening 39 (closing direction Y) do not coincide. Ultimately, a spreading apart or prizing open of the two housing sections 13, 15 therefore results in a wedging of the locking bolt 23 in the engagement opening 39 so that a complete opening of the receiving gap and thus an unauthorized release of the brake disk lock from the brake disk is prevent or is at least made substantially more difficult.

This wedging of the locking bolt 23 at the second housing section 15 can, as explained, be realized with an automatic function of the brake disk lock, whereby a high operating comfort results. Furthermore, the locking bolt 23 can be made substantially rotationally symmetrical and can be guided in the first housing section 13 without an additional rotary movement, with the locking bolt end 37 nevertheless being fixed to the second housing section 15 in the event of a break-open attempt. The brake disk lock therefore hereby also has an advantageously simple structure and can be manufactured corresponding cost-effectively (e.g. substantially bar-shaped locking bolt 23).

Due to the oblique position of the latch passage 41 (acute-angled or parallel alignment of the keyway of the lock cylinder 47 relative to the direction of extent X of the receiving gap 19) a compact construction of the brake disk lock results.

Due to the explained snap fit of the latch 59 to the holding ring 33 of the locking bolt 23, the latch 59 cannot be moved briefly from the latched position into the unlatched position by direct blows onto the lock body 11 to bring the locking bolt 23 into the release position in an unauthorized manner. Protection against the so-called "hammer blow method" is therefore achieved by the engagement of the engagement nose 65 into the engagement recess 67.

The invention claimed is:

1. A brake disk lock having a lock body which has a first housing section and a second housing section which bound a receiving gap for the reception of a brake disk, wherein a locking bolt is provided at the first housing section and is movable along a closing direction from a release position into a closed position, with the locking bolt engaging in the closed position into an engagement opening of the second housing section and closing the receiving gap,
   wherein the closing direction of the locking bolt is aligned at an angle different from 90° obliquely to the receiving gap of the lock body,
   wherein a latch is furthermore provided at the first housing section and is movable along a latching direction from an unlatched position into a latched position, with the latch latching the locking bolt in the latched position in the closed position and with the latch releasing the locking bolt for a movement into the release position in the unlatched position,
   wherein the latching direction of the latch is aligned obliquely to the closing direction of the locking bolt, and
   wherein the latching direction of the latch is aligned obliquely or parallel to the receiving gap.

2. A brake disk lock in accordance with claim 1, wherein the closing direction of the locking bolt is aligned at an angle between 60° and 80°, in particular at an angle of approximately 70°, obliquely to the receiving gap.

3. A brake disk lock in accordance with claim 1, wherein the end of the locking bolt remote from the engagement opening is inclined in the direction of the closed end of the receiving gap.

4. A brake disk lock in accordance with claim 1, wherein the engagement opening of the second housing section receives the locking bolt in a substantially shape matched manner.

5. A brake disk lock in accordance with claim 1, wherein the locking bolt is made cylindrical with respect to its closed position at least in the region of the receiving gap and of the engagement opening of the second housing section.

6. A brake disk lock in accordance with claim 1, wherein the locking bolt is movable from the release position into the closed position without an additional rotary movement about its longitudinal axis.

7. A brake disk lock in accordance with claim 1, wherein the locking bolt is biased by means of a first spring in the direction of the release position.

8. A brake disk lock in accordance with claim 1, wherein a lock cylinder cooperating with the latch is provided at the first housing section of the lock body, with the lock cylinder being aligned obliquely to the closing direction of the locking bolt.

9. A brake disk lock in accordance with claim 1, wherein a lock cylinder cooperating with the latch is provided at the first housing section of the lock body, with the lock cylinder being aligned obliquely or parallel to the receiving gap.

10. A brake disk lock in accordance with claim 1, wherein a lock cylinder cooperating with the latch is provided at the first housing section of the lock body, with the lock cylinder being aligned obliquely to the closing direction of the locking bolt and being aligned obliquely or parallel to the receiving gap, preferably being aligned acute-angled to the receiving gap.

11. A brake disk lock in accordance with claim 1, wherein the latch is biased in the direction of the latched position by means of a second spring, with a lock cylinder with a driver device being provided at the first housing section and with the latch being movable selectively from the latched position into the unlatched position by means of the driver device.

12. A brake disk lock in accordance with claim 1, wherein the latch is connected to the locking bolt by a snap fit when the locking bolt is in the closed position and the latch is in the latched position.

13. A brake disk lock having a lock body which has a first housing section and a second housing section which bound a receiving gap for the reception of a brake disk, wherein a locking bolt is provided at the first housing section and is movable along a closing direction from a release position into a closed position, with the locking bolt engaging in the closed position into an engagement opening of the second housing section and closing the receiving gap,
wherein the closing direction of the locking bolt is aligned at an angle different from 90° obliquely to the receiving gap of the lock body,
wherein the locking bolt is biased by means of a first spring in the direction of the release position,
wherein a latch is furthermore provided at the first housing section and is movable along a latching direction from an unlatched position into a latched position, with the latch latching the locking bolt in the latched position in the closed position and with the latch releasing the locking bolt for a movement into the release position in the unlatched position,
wherein the latch is biased in the direction of the latched position by means of a second spring, with a lock cylinder with a driver device being provided at the first housing section and with the latch being movable selectively from the latched position into the unlatched position by means of the driver device,
wherein the latch is connected to the locking bolt by a snap fit when the locking bolt is in the closed position and the latch is in the latched position,
wherein the latching direction of the latch is aligned obliquely to the closing direction of the locking bolt, and
wherein the latching direction of the latch is aligned obliquely or parallel to the receiving gap.

14. The brake disk lock as defined in claim 13 wherein the locking bolt has a first engagement surface and the latch has a second engagement surface, wherein, when the locking bolt is in the closed position and the latch is in the latched position, the first spring urges the first engagement surface against the second engagement surface to prevent the latch from moving into the unlatched position.

15. A brake disk lock comprising:
a lock body having a first housing section and a second housing section which bound an elongated receiving gap for the reception of a brake disk, said second housing section having an engagement opening,
a locking bolt movably mounted in said first housing section and movable along a closing direction between a release position in which said bolt is refracted from said gap and a closed position in which said bolt extends across said gap and into said engagement opening,
wherein an axis of said closing direction intersects a longitudinal axis of said receiving gap at an oblique angle,
a latch movably mounted along a latch axis in said first housing section and movable between a latched position in which said latch engages and retains said locking bolt in said closed position and an unlatched position in which said latch releases said locking bolt for movement along said closing direction to said release position,
wherein said latch axis is oblique to said closing direction.

16. The brake disk lock as defined in claim 15 and comprising:
a lock cylinder mounted in said first housing section,
said latch being movably mounted to said lock cylinder between an extended position and a retracted position,
a spring which urges said latch toward said extended position,
wherein an actuating surface on said locking bolt cooperates with a surface on said latch to move said latch toward said retracted position as said locking bolt moves from said released to said closed position to allow said actuating surface to pass by said latch, said spring returning said latch to said extended position when said locking bolt reaches said closed position.

17. The brake disk lock as defined in claim 16 and comprising a bolt spring which urges said locking bolt toward said released position.

18. The brake disk lock as defined in claim 17 wherein the locking bolt has a first engagement surface and the latch has a second engagement surface, wherein, when the locking bolt is in the closed position and the latch is in the latched position, the bolt spring urges the first engagement surface against the second engagement surface to prevent the latch from moving into the unlatched position.

* * * * *

UNITED STATES PATENT AND TRADEMARK OFFICE
CERTIFICATE OF CORRECTION

PATENT NO. : 8,037,722 B2  Page 1 of 1
APPLICATION NO. : 12/817584
DATED : October 18, 2011
INVENTOR(S) : Hoi Jarm Ng et al.

It is certified that error appears in the above-identified patent and that said Letters Patent is hereby corrected as shown below:

Cover page, Assignee: "Soechne" should read -- Söhne --.

Column 8, claim 15, line 26, delete "refracted" Insert -- retracted --.

Signed and Sealed this
Twenty-fourth Day of April, 2012

David J. Kappos
*Director of the United States Patent and Trademark Office*